United States Patent
Tran

(10) Patent No.: US 6,788,703 B2
(45) Date of Patent: Sep. 7, 2004

(54) DS0 ON ATM, MAPPING AND HANDLING

(75) Inventor: Nang Tran, San Jose, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/222,777

(22) Filed: Dec. 30, 1998

(65) Prior Publication Data

US 2003/0043842 A1 Mar. 6, 2003

(51) Int. Cl.[7] .......................... H04L 12/66; H04L 12/28; H04J 3/16; H04J 3/22
(52) U.S. Cl. ........................ 370/465; 370/352; 370/395; 370/467
(58) Field of Search .................................. 370/465, 466, 370/376, 535, 542, 257, 352, 364, 384, 385, 395; 455/428, 432, 445, 560

(56) References Cited

U.S. PATENT DOCUMENTS

| | | | |
|---|---|---|---|
| 4,661,947 A | 4/1987 | Lea et al. | 370/60 |
| 4,670,871 A | 6/1987 | Vaidya | 370/60 |
| 5,124,978 A | 6/1992 | Chao | 370/60 |
| 5,126,999 A * | 6/1992 | Munter et al. | 370/415 |
| 5,311,509 A | 5/1994 | Heddes et al. | 370/60 |
| 5,345,446 A | 9/1994 | Hiller et al. | 370/60.1 |
| 5,365,524 A | 11/1994 | Hiller et al. | 370/94.2 |
| 5,367,520 A * | 11/1994 | Cordell | 370/395 |
| 5,390,175 A | 2/1995 | Hiller et al. | |
| 5,392,280 A | 2/1995 | Zheng | |
| 5,396,492 A | 3/1995 | Lien | 370/60 |
| 5,412,655 A | 5/1995 | Yamada et al. | |
| 5,568,486 A * | 10/1996 | Huscroft et al. | 370/94.2 |
| 5,577,075 A | 11/1996 | Cotton et al. | 375/356 |
| 5,673,265 A * | 9/1997 | Gupta et al. | 370/432 |
| 5,734,979 A * | 3/1998 | Lu et al. | 455/428 |
| 5,771,232 A * | 6/1998 | Sinibaldi et al. | 370/384 |
| 5,781,547 A | 7/1998 | Wilson | 370/395 |
| 5,831,970 A * | 11/1998 | Arao | 370/227 |
| 5,841,771 A | 11/1998 | Irwin et al. | 370/360 |
| 5,844,891 A | 12/1998 | Cox | 370/235 |
| 5,859,846 A | 1/1999 | Kim et al. | 370/389 |
| 5,862,136 A * | 1/1999 | Irwin | 370/395 |
| 5,864,542 A * | 1/1999 | Gupta et al. | 370/257 |
| 5,870,474 A * | 2/1999 | Wasilewski et al. | 380/21 |
| 5,905,725 A | 5/1999 | Sindhu et al. | |
| 5,982,767 A * | 11/1999 | McIntosh | 370/352 |
| 5,982,783 A * | 11/1999 | Frey et al. | 370/467 |
| 5,999,518 A * | 12/1999 | Nattkemper et al. | 370/258 |
| 5,999,529 A * | 12/1999 | Bernstein et al. | 370/376 |
| 6,009,095 A | 12/1999 | Honma | |
| 6,009,100 A | 12/1999 | Gausmann et al. | 370/397 |
| 6,014,378 A | 1/2000 | Christie et al. | 370/356 |
| 6,026,091 A | 2/2000 | Christie et al. | 370/395 |
| 6,034,956 A | 3/2000 | Olnowich et al. | 370/388 |
| 6,081,525 A | 6/2000 | Christie et al. | 370/392 |
| 6,088,359 A * | 7/2000 | Wicklund et al. | 370/395 |
| 6,091,734 A * | 7/2000 | Suzuki et al. | 370/410 |
| 6,097,726 A | 8/2000 | Puntambekar et al. | 370/397 |
| 6,111,878 A | 8/2000 | Powell | 370/395 |

(List continued on next page.)

OTHER PUBLICATIONS

Black Uyless D., "ATM Foundation for Broadband Networks," Prentice Hall PTR, Englewood Cliffs, New Jersey 07632, 1995, pp. 181–202.

*Primary Examiner*—M. Phan
(74) *Attorney, Agent, or Firm*—Kevin L. Smith

(57) ABSTRACT

The present invention guarantees that voice data (and other information types) will switch within a predetermined time period. Systems and methods consistent with the present invention accomplish this guarantee by, among other things, establishing permanent virtual paths between each network element, guaranteeing each voice line a slot in a packet in each frame, employing both octet switching and packet switching, synchronizing the operation of the network elements to a reference clock, and providing several levels of network redundancy.

20 Claims, 16 Drawing Sheets

U.S. PATENT DOCUMENTS

| | | | |
|---|---|---|---|
| 6,125,117 A * | 9/2000 | Martin et al. | 370/397 |
| 6,137,778 A | 10/2000 | Yoshida | 370/231 |
| 6,151,325 A * | 11/2000 | Hluchyj | 370/398 |
| 6,157,643 A * | 12/2000 | Ma | 370/389 |
| 6,157,646 A | 12/2000 | Nichols | 370/395 |
| 6,169,735 B1 | 1/2001 | Allen, Jr. et al. | |
| 6,181,694 B1 * | 1/2001 | Pickett | 370/353 |
| 6,208,654 B1 * | 3/2001 | Moteki et al. | 370/395 |
| 6,243,361 B1 | 6/2001 | McMillen et al. | 370/254 |
| 6,266,343 B1 | 7/2001 | Caves | |
| 6,282,189 B1 * | 8/2001 | Eames | 370/352 |
| 6,289,018 B1 * | 9/2001 | Song | 370/395 |
| 6,301,269 B1 | 10/2001 | Tayloe et al. | 370/519 |
| 6,317,431 B1 | 11/2001 | Hodgkinson et al. | 370/395 |
| 6,324,165 B1 * | 11/2001 | Fan et al. | 370/232 |
| 6,341,149 B1 | 1/2002 | Bertacchini et al. | 375/356 |
| 6,363,074 B1 * | 3/2002 | Schmidt et al. | 370/397 |
| 6,373,837 B1 | 4/2002 | Kleyman et al. | |
| 6,377,550 B1 | 4/2002 | Prasad | |
| 6,389,014 B1 * | 5/2002 | Song | 370/376 |
| 6,389,019 B1 | 5/2002 | Fan et al. | |
| 6,404,765 B1 * | 6/2002 | Bernstein et al. | 370/389 |
| 6,424,649 B1 | 7/2002 | Laor et al. | 370/359 |
| 6,480,511 B1 | 11/2002 | Petty | |
| 6,532,213 B1 | 3/2003 | Chiussi et al. | |
| 6,532,243 B1 | 3/2003 | Leijonhufvud | |
| 6,563,837 B2 | 5/2003 | Krishna et al. | |

* cited by examiner

DS0 ON ATM, MAPPING AND HANDLING

RELATED APPLICATIONS

This application is related to U.S. patent application Ser. No. 09/222,927, entitled PRIVATE BRANCH EXCHANGE BUILT USING AN ATM NETWORK; U.S. patent application Ser. No. 09/222,782, entitled VIRTUAL JUNCTORS; U.S. patent application Ser. No. 09/222,806, entitled MULTIPLE NODE NETWORK ARCHITECTURE; and U.S. patent application Ser. No. 09/222,781, entitled USING AN ATM SWITCH TO GROW THE CAPACITY OF A SWITCHING STAGE.

BACKGROUND OF THE INVENTION

The present invention relates to an apparatus and method for conveying information from a variety of sources to a variety of destinations, via a common network. More particularly, the invention relates to an apparatus and method for mapping time-division multiplex data into packets.

A typical digital telecommunications network provides a continuous bit rate service using Time Division Multiplexing (TDM). Telephone sets as well as other terminal devices are connected to network ports via telephone lines. The network ports include interfaces for converting analog signals from the terminal devices into pulse code modulated (PCM) signals for transmission through the digital telecommunications network. In a communication between an originating port and a destination port on the digital network, information is transmitted over a single high-speed channel in a pre-assigned time-slot on periodic transmit and receive frames. Circuit switches operate to switch the information from the originating port to the destination port.

While TDM networks provide an adequate service for synchronous data like voice and video, TDM is not well suited for bursty (i.e., asynchronous) computer transmissions. As a result, packet switching was introduced to provide efficient transport of computer transmissions. In packet switching networks, data signals are arranged into packets of any convenient length. The packets can be a fixed-length or a variable length. Each packet includes a header for, among other things, specifying a destination of the packet. After a packet has been assembled, a high-speed transmission path is allocated, but only for a time sufficient to transport the packet of data toward its destination. Although digitized voice can be transported in this manner, the wide variances in delay caused by the operating characteristics of a packet network has demonstrated that packet switching is less than desirable at this point in time.

Fortunately, a broadband communications standard exists for accommodating both synchronous and asynchronous communication applications. This standard, known as the Asynchronous Transfer Mode (ATM) standard, packs data into frames, each frame comprising a plurality of "cells," each cell being 53 bytes (i.e., octets) long. The 53 bytes in an ATM cell include a 5-byte header and a 48-byte payload. The 5-byte header generally includes a virtual path identifier (VPI) portion to associate the cell with a virtual path, a virtual channel identifier (VCI) portion to associate the cell with a virtual channel, a payload type portion to identify the type of information in the payload, a header error control portion, and a group flow control portion. The recommended standards are defined by the ATM Forum and are available from several publishers, such as Prentice Hall of Englewood Cliffs, N.J. 07632, under the title ATM User-Network Interface Specification Version 3.0 (ISBN 0-13-225863-3).

The ATM protocol was designed to support many different applications within a network, and to treat each application according to its needs. Specifically, the ATM protocol allows voice, video, and computer transmissions to be combined over the same network. As noted, the transmission needs of each of these applications vary. In particular, some forms of data, like e-mail, are delay insensitive while other forms of data, like voice and video, are delay sensitive. To meet the transmission needs of each application, ATM networks use complicated rules that specify how the network should treat each information type. In particular, typical ATM networks provide a set of instructions for packing information into the ATM cells.

The process of packing information signals into cells or packets is known as "mapping." For each information type supported by the network, the network implements a different mapping scheme dependent upon the transmission needs of that information type. In addition to the mapping scheme, the network assigns a priority level to each information type. The network then allocates more resources to higher priority data. For example, when there is more information that must be transmitted in a given frame than there are available cells for carrying that information, higher priority level data will be transmitted first. In this manner, the various information signals may or may not be granted access to the network.

The complexity of the ATM mapping often leads to lengthy delays. Real time data, such as video and voice, may be adversely affected by such delays. For example, delays in the delivery of voice signals may cause echoing and jitter, thereby hindering the natural flow of conversation. In most ATM systems, multiple samples of a single audio stream are collected until a fixed-size ATM cell is full; this directly causes a six-millisecond delay. In a typical long-distance communication, there are repeated conversions from ATM to TDM and from TDM to ATM to make use of existing public switching telephone network (PSTN) facilities (which use T1/E1 lines). Each such conversion into ATM cells causes the six-millisecond packetization delay. End to end, such delays can easily exceed the level where echo cancellation is required for analog telephone sets. In addition, echo cancellation is difficult and often imperfect.

In some ATM systems, samples from various data streams are collected and placed into each fixed-size ATM cell. In other words, samples from the same data stream may be transmitted in different ATM cells. These ATM cells may be routed through different paths to the destination. As a result, samples from the same data stream might not be received at the destination end in the same order in which they were sent at the originating end. The network includes components to reorder the information signals. This reordering of the data may result in additional delay.

ATM switches may introduce further delay in the transmission of data. ATM switches receive incoming ATM cells on a virtual connection and switch the entire cell to another virtual connection based on destination information in the cell's header. The ATM switches often establish a new route for each cell that they switch. The establishment of the virtual connections on an as-needed basis may introduce network control delays.

SUMMARY OF THE INVENTION

Accordingly, the present invention is directed to systems and methods that substantially obviate one or more of the above problems (as well as other disadvantages in conventional telecommunications networks). In particular, systems and methods consistent with the present invention provide network access to each communication line connected to the network. In addition, systems and methods consistent with the present invention minimize network processing delays.

In accordance with the purposes of the invention, as embodied and broadly described, systems consistent with the invention include a network element for mapping time-division multiplex (TDM) data from plural ports into packets. The network element writes the TDM data from each port into a packet slot pre-assigned to the port. These preassigned packet slots are maintained available for TDM data received from the corresponding port regardless of the presence of TDM data on the corresponding port. In this manner, the present invention provides for transmission of data from each port in each frame.

In another aspect, the invention comprises a method of mapping TDM data from a plurality of ports into packets. The method includes receiving TDM data from a plurality of ports and writing the TDM data from each port into a packet slot pre-assigned to the port. Each packet slot remains available for TDM data received from its pre-assigned port even if there is no data present on the port.

The above description of the invention and the following description for carrying out the best mode of the invention should not restrict the scope of the claimed invention. Both provide examples and explanations to enable others to practice the invention.

BRIEF DESCRIPTION OF THE DRAWINGS

The accompanying drawings, which are incorporated in and constitute a part of this specification, illustrate and together with the description, serve to explain the principles of the invention.

In the Drawings

DESCRIPTION OF THE PREFERRED EMBODIMENT

Figure 1:
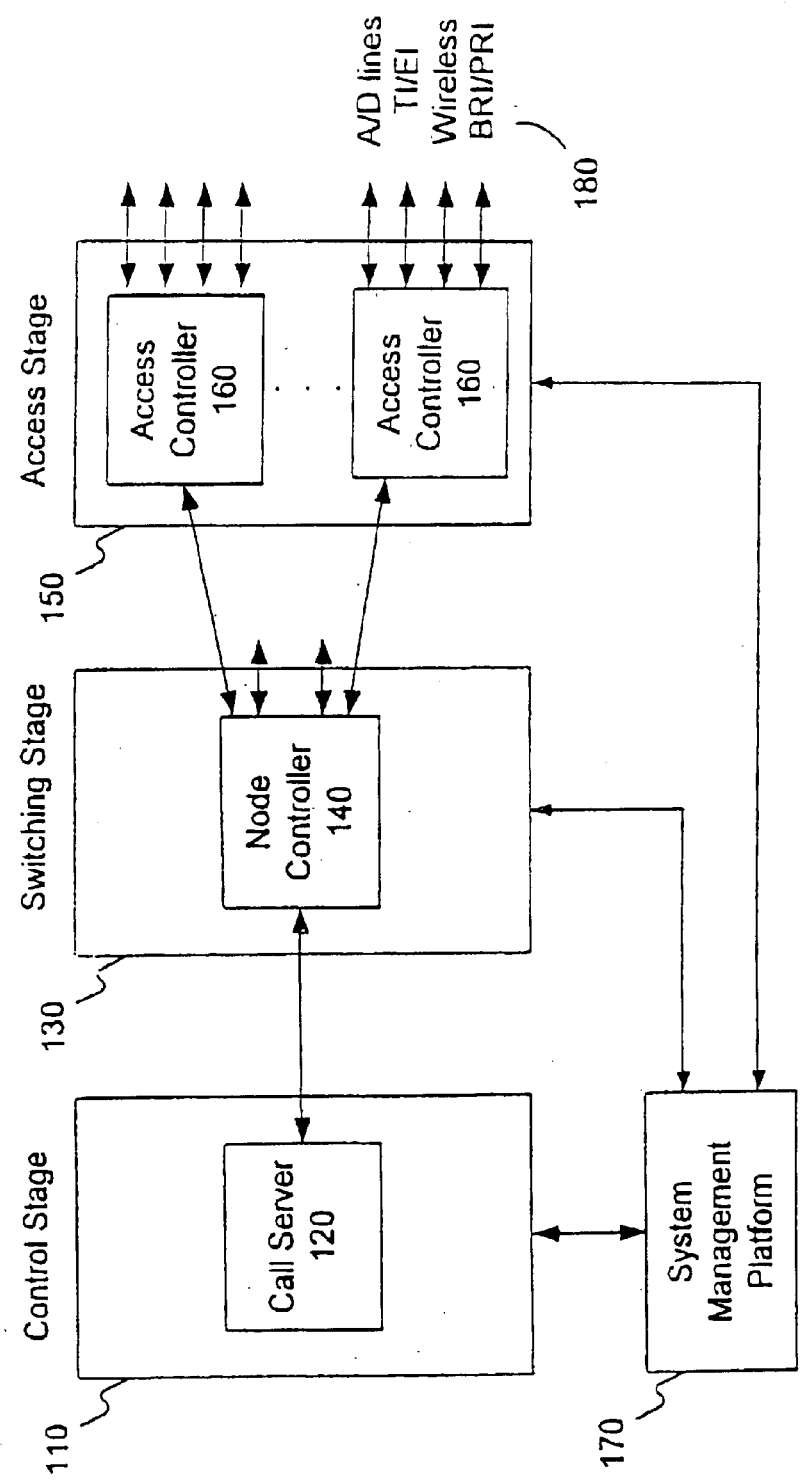
FIG. 1 is a block diagram of a single node communication network consistent with the invention.

Reference will now be made to the present preferred embodiment of the invention, an example of which is illustrated in the accompanying drawings. Where appropriate, the same reference numerals refer to the same or similar elements. While the appended claims define the scope of the invention, the following description does not limit that scope. While the appended claims define the scope of the invention, the following description does not limit that scope.

System Architecture

Systems and methods consistent with the invention include M node controllers interconnected by an inter-node switch. A node controller is a basic switching unit, which supports a limited number of peripheral groups. In the preferred embodiment, the node controller supports 1,024 communication lines. The number of node controllers, M, is based upon the number of communication lines that must be switched by the network. In a system where M=1, the inter-node switch is not necessary. Therefore, two basic configurations are defined: a single node architecture consisting of exactly one switching node, shown in FIG. 2, and a multiple node architecture, consisting of two or more switching nodes and one inter-node switch, shown in FIG. 4.

FIG. 1 is a block diagram of a single node architecture consistent with the present invention. The network includes control stage 110, switching stage 120, and access stage 1150. As shown, switching stage 130 encompasses a single node controller 140, connected to one or more access controllers 160 on one side and connected to call server 120 on the other side. The connection between each network element is, for example, composed of an ATM compliant fiber optic cable, preferably running OC-3 framing at 155.52 Mbps. The ATM cells are carried within this framing structure. Of course, those skilled in the art would appreciate that the system could utilize any other desirable electrical or optical link and any other desirable link framing structure, such as STS-3 (155.52 Mbps), STS-1 or OC-1 (51.84 Mbps), STS-9 or OC-9 (466.56 Mbps), or STS-12 or OC-12 (622.08 Mbps).

The access stage 150 provides connectivity between the switching stage 130 and the peripherals (e.g., A/D lines, T1/E1 lines, wireless, and BRI/PRI) 180 that provide voice, video, computer transmissions and any other desired information type. In addition to data, the peripherals provide signalling (i.e., messaging) instructions that, among other things, inform the network of the location of the destination party in a communication between an originating party and a destination party. In the preferred embodiment, each access controller 160 provides network access to 640 communication lines 180, each carrying data in Digital Signal-0 format (DS0) plus two signalling bits. The term DS0 refers to 64 Kbs pulse-code modulated samples of data. Of course, one of ordinary skill in the art would appreciate that the methods and systems consistent with the invention could receive digital input signals of any desired format. For simplicity in explaining the invention, the written description will simply refer to DS0 data.

In accordance with the invention, access controller 160 maps the incoming DS0 data and messaging onto ATM cells.

Figure 2:
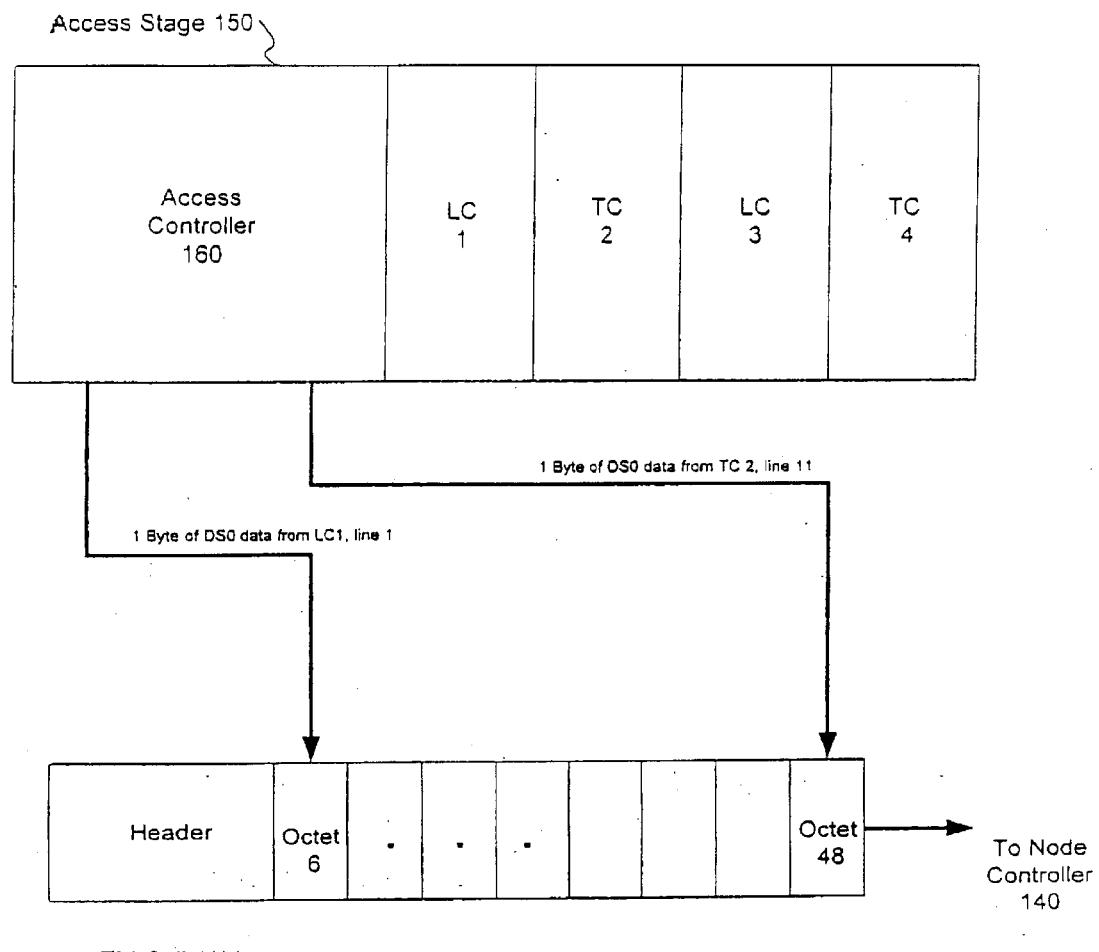
FIG. 2 illustrates DS0 to cell mapping consistent with the invention.

FIG. 2 illustrates a mapping process consistent with the invention. Access controller 160 receives communication lines from line card 1 (LC1), trunk card 2 (TC2), line card 3 (LC3) and trunk card 4 (TC4). In the example illustrated in FIG. 2A, each line card (LC1 and LC3) has 32 communication lines. Access controller 160 maps the DS0 data on each of the communication lines into a dedicated slot in a dedicated ATM cell in each transmission frame.

For example, in a 125-microsecond frame where 14 cells are dedicated for transmitting DS0 data, the cell number assigned to a given communication line equals 1 to 14. Where each cell slot corresponds to a byte or octet, the cell slot number equals 1 to 48, corresponding to the 48-octet payload of an ATM cell. This example is illustrated in FIG. 2. The access controller 160 maps one byte of DS0 data from the first communication line in line card 1 (LC1) into the first payload octet of the first ATM cell. Although not shown, the access controller 160 maps one byte of DS0 data from the second communication line in line card 1 (LC1) into the second payload octet of the first ATM cell. Similarly, the access controller 160 maps one byte of DS0 data from each of the communication lines in line card 1 (LC1), trunk card 2 (TC2), line card 3 (LC3) and trunk card 4 (TC4) onto a payload octet of an ATM cell. For example, as shown, the access controller 160 maps the DS0 data from the fourteenth line in trunk card 2 (TC2) into the forty-eighth payload octet of first ATM cell.

Preferably, the DS0 data from a particular communication line is sent to the same prefixed slot in a frame. Generally, the assignment to a particular cell and cell slot is based on the location of the line in the peripheral shelf. Even if no data is present on the communication line, the designated cell slot corresponding to that line is kept available for data from that communication line.

In this manner, the access controller provides a "non-blocking network." In other words, the network guarantees transmission of data from the originating line to the terminating or destination line in each frame. In addition, processing delays are minimized because the mapping technique is constant and simple. The access controller consistent with the present invention eliminates the need to reorder the DS0 data on the terminating end of the ATM network.

After mapping the messaging and DS0 data into ATM cells, access controller 160 transmits the ATM cells to the node controller 140. In the single node architecture, DS0 data and messaging flow from the access controllers 160 to the node controller 140 and from the node controller 140 to the access controllers 160. Again, the DS0 data is preferably received and transmitted in 14 ATM cells every 125 microseconds.

Node controller 140 performs DS0 switching and message routing. The switching provided by node controller 140 is also non-blocking. As applied to the node controller 140, "non-blocking" means that any communication line can be switched to any other line at any time. The data can be switched to any other line within the same access controller group or a different access controller group. When a connection is set up between an originating line and a destination line, a switching path is established through the access controller(s) and the node controller until the connection is terminated.

Control stage 110 includes call server 120. Call server 120 sends messaging signals to and receives messaging signals from the node controller 140. Based on messaging signals sent from the peripherals 180 to the access controller 160 to the node controller 140 to the call server 120, the call server 120 determines the identity of the originating communication line and the identity of the destination communication line. The call server 120 then sends messaging to the node controller 140, directing the node controller 140 to switch the data from the originating line to the destination line.

The System Management Platform (SMP) 170 manages the control stage 110, the switching stage 130, and the access stage 150. Essentially, SMP 170 is a personal computer-based user interface that allows the system administrator to configure, administer, monitor, and maintain each network element. For example, the network administrator can specify the number of terminals, trunks, and cards connected to an access controller 160. In addition, SMP 170 performs fault treatment, accounting, and security control functions.

Figure 3:
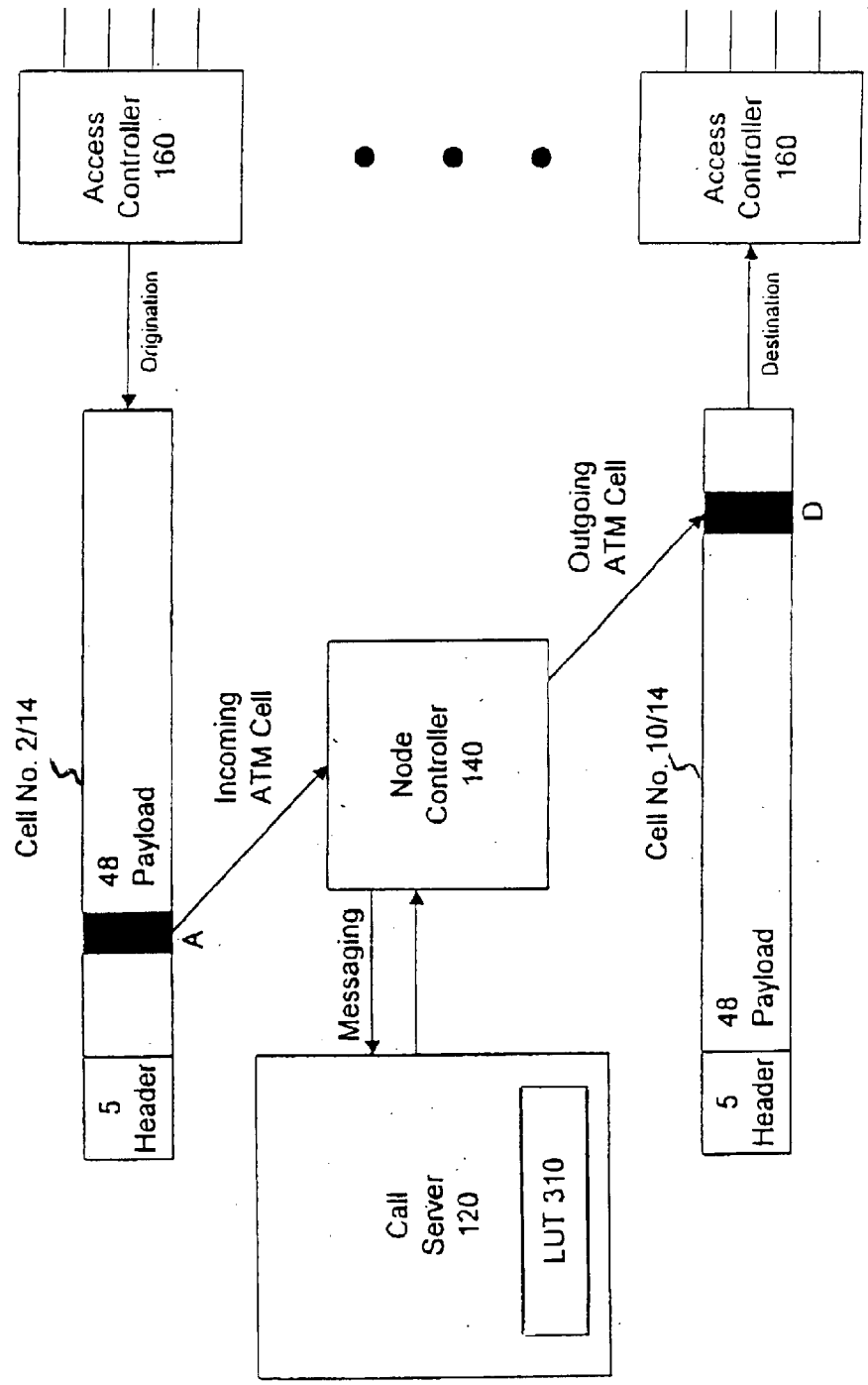
FIG. 3 illustrates cell translation by an access controller and cell slot switching by a node controller in accordance with an embodiment of the invention.

An example of the operation of the single node architecture is illustrated in FIG. 3. When a user originates a connection (e.g., by picking up the telephone and dialing a destination telephone number), a message conveying the destination number is sent from access controller 160 to node controller 140 to call server 120. The message is carried in an ATM cell. Upon receipt of the message, call server 120 looks up the destination number in a look-up table 210 to determine the cell number and cell slot assigned to that destination number. The call server 120 thus determines the pair of communication lines (and thus the corresponding cell numbers and cell slots) involved in the call. For example, in FIG. 3, the cell number, slot number assigned to the originating line is 2, A. The cell number, slot number assigned to the destination line is 10, D. The call server 120 then sends messages to the node controller 140, directing the node controller 140 to switch the data in cell no. 2, cell slot A (assigned to the originating line) into cell no. 10, cell slot D (assigned to the destination line). A switching path between the originating line and the destination line is thus established. The node controller continues to switch data in the cell slot assigned to the originating line (i.e., 2, A) into the cell slot assigned to the destination line (i.e., 10, D) until the call server directs the node controller to stop doing so. Specifically, when the user terminates the connection (e.g., by placing the telephone on-hook), the access controller 160 sends an "on-hook" message to the call server 120 through the node controller 140. In response, the call server terminates the switching path between cell no. 2, cell slot A and cell no. 10, cell slot D.

Each node controller is capable of switching multiple lines up to a limited capacity. In the preferred embodiment, each node controller can switch DS0 data from up to 1,024 ports. In order to build a system with many times that capacity, a second stage ATM switching element must be employed. In other words, to facilitate more than 1,024 ports, systems and methods consistent with the present invention use a multiple node structure with a second stage switch for switching between the nodes. A standard ATM or packet switch serves as the second stage switch. However, as noted above, these standard switches may introduce delay. To provide a second stage switch without introducing delay, methods and systems consistent with the invention use a common clock reference and permanent virtual paths to route DS0 loaded cells between node controllers through the standard ATM switch. The permanent virtual paths between the node controllers and the inter-node switch are interchangeably referred to as virtual junctors.

Figure 4:
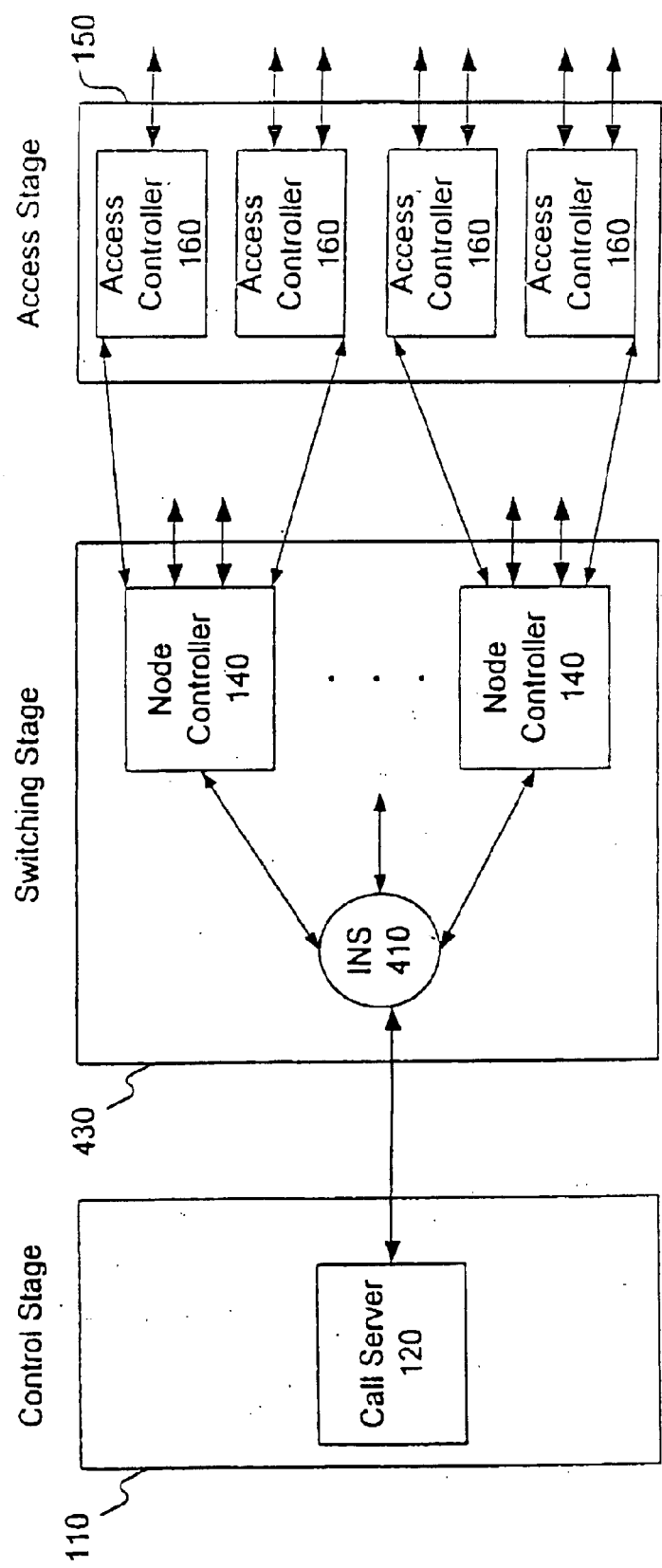
FIG. 4 is a block diagram of a multiple node communication network consistent with the invention.

FIG. 4 is a block diagram of the multi-node architecture, including call server 120, inter-node switch (INS) 410, plural node controllers 140, and plural access controllers 160. Each node controller 140 connects on one side to four access controllers 160 and on the other side to the INS 410.

The INS 410 interfaces with the call server 120, the node controller 140, and application servers (such as Meridian Mail or Interactive Voice Response applications). As in the single node architecture, PCM data preferably flows in 14 ATM cells every 125 microseconds and is switched by the node controller and the INS.

In the multiple node architecture, node controller 140 is the first stage of switching network 430 while inter-node switch 410 is the second stage of the switching network 430. As in the single-node architecture, the node controller performs switching between access controllers connected to the same node controller. This is known as "intra-node switching." Also as in the single-node architecture, node controller 140 provides both cell slot and cell switching. The inter-node switch facilitates switching between access controllers connected to different node controllers. This is known as "inter-node switching."

The inter-node switch (INS) provides standard ATM cell switching. A preferred INS offers scalability in modules of 4 ATM ports and can expand to up to 8 modules or 32 ATM ports. The INS 410 provides for connection paths between multiple node controllers while transferring messaging between the multiple node controllers 140 and the call server 120.

The paths interconnecting the access controller 160, the node controller 140, the inter-node switch 410, and the call server 120 are virtual paths. The paths are permanent, that is, they are predefined and continually available. If information is not being transmitted over the path, then it does not take up any space on the network. In other words, an unused permanent virtual path does not use any bandwidth. The path is virtual in the sense that the path is assigned an address, but it is not hardwired. Permanently establishing the virtual paths, as opposed to establishing paths on an as-needed basis, is desirable because less processing is needed, thus making switching by the INS and the node controller easier and faster.

Figure 5:
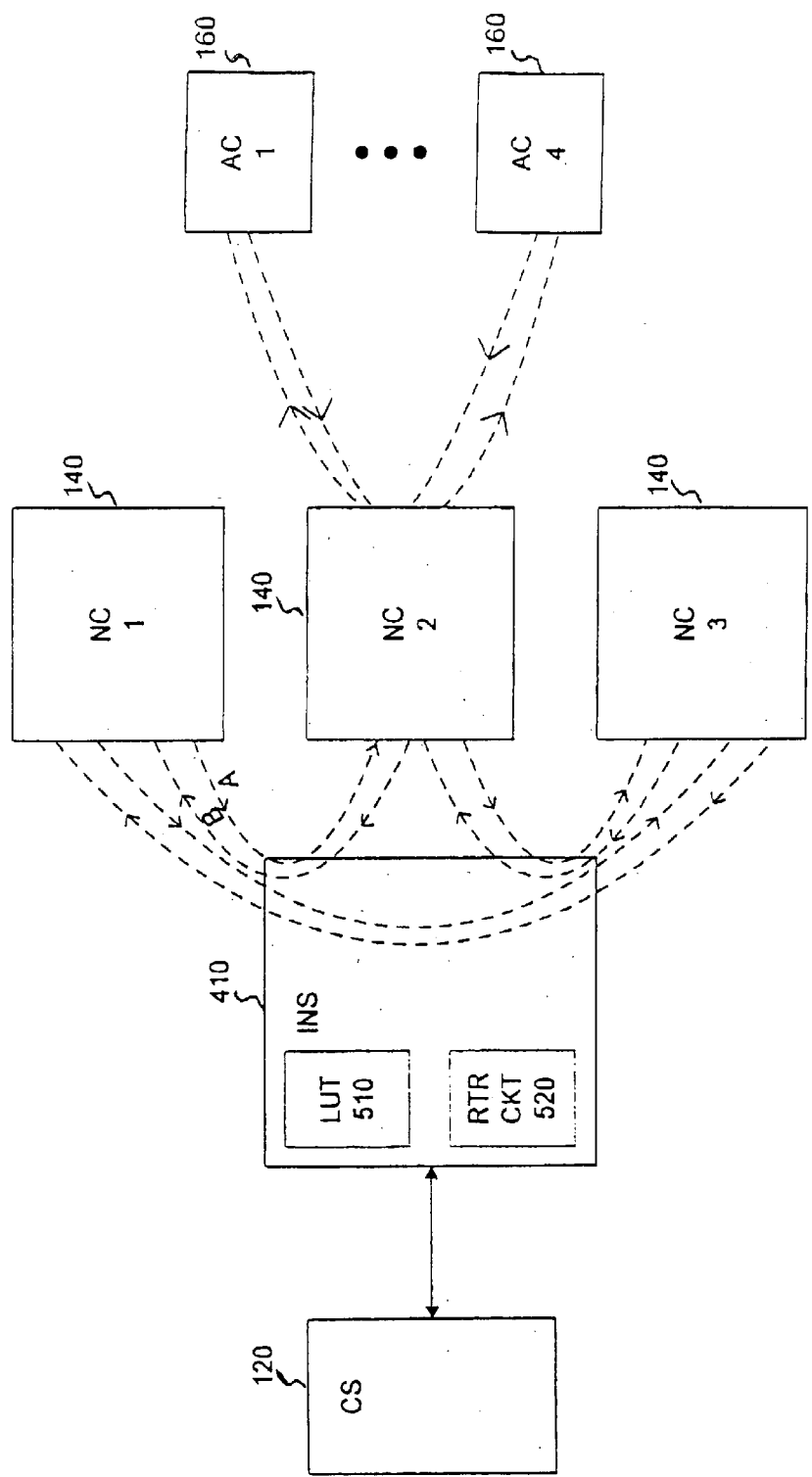
FIG. 5 illustrates permanent virtual circuits in a block diagram of a network in accordance with an embodiment of the invention.

FIG. 5 is a block diagram of the multi-node architecture illustrating the permanent virtual paths. Each node controller 140 is connected to the other node controllers in the system through the inter-node switch 410. For example, as shown, two permanent virtual paths connect node controller 1 to node controller 2 through the inter-node switch 310. The first virtual path, A, carries cells traveling from node controller 1 through the inter-node switch 410 to node controller 2. The second virtual path, B, carries cells traveling from node controller 2 through the inter-node switch 410 to node controller 1. Node controller 1 is also connected to node controller 3 via two permanent virtual paths. Likewise, node controller 2 is connected to node controller 3 via two permanent virtual paths.

A similar path structure connects each access controller 160 to the other access controllers through the node controller 140. As shown in FIG. 5, two permanent virtual paths connect access controller 1 to access controller 4. The first path carries cells traveling from access controller 1 through node controller 2 to access controller 4. The second path carries cells traveling from access controller 4 through node controller 2 to access controller 1. Although not shown, two permanent virtual paths connect access controller 1 and access controller 2, two permanent virtual paths connect access controller 2 and access controller 3, and two permanent virtual paths connect access controller 3 and access controller 4—all through node controller 2.

The INS 410 is configured with the permanent virtual paths connecting each node controller to all other node controllers. In particular, the INS 410 includes a look-up table 510 for storing the permanent virtual paths and routing circuitry 520 to switch a cell received from one node controller to another node controller via the appropriate permanent virtual path. The virtual paths are permanently reserved in the INS look-up table 510 at system start-up. Thereafter, the INS 410 performs its role without control by the call server on a call by call basis. The permanent virtual paths may be reconfigured via a user interface on the SMP 170 (FIG. 1).

Inter-node switching is preferably achieved using traditional ATM cell switching. With no inter-node traffic, the ATM link from the node controller to the INS 410 conveys idle cells. When an inter-node connection is established between node controller 1 and node controller 2, an idle cell is assigned to convey the traffic from node controller 1 to node controller 2 through the INS. The cells on the ATM link between the node controller and the INS are arranged in a frame which matches the TDM rate (e.g., 125 microseconds). The cell is tagged with a pre-defined permanent virtual circuit between node controllers 1 and 2. Because the PVCs are permanently reserved between the node controllers and the INS, and the ATM cells are transmitted at the PCM rate, delay in the delivery of voice signals is constant and minimal.

Figure 6:
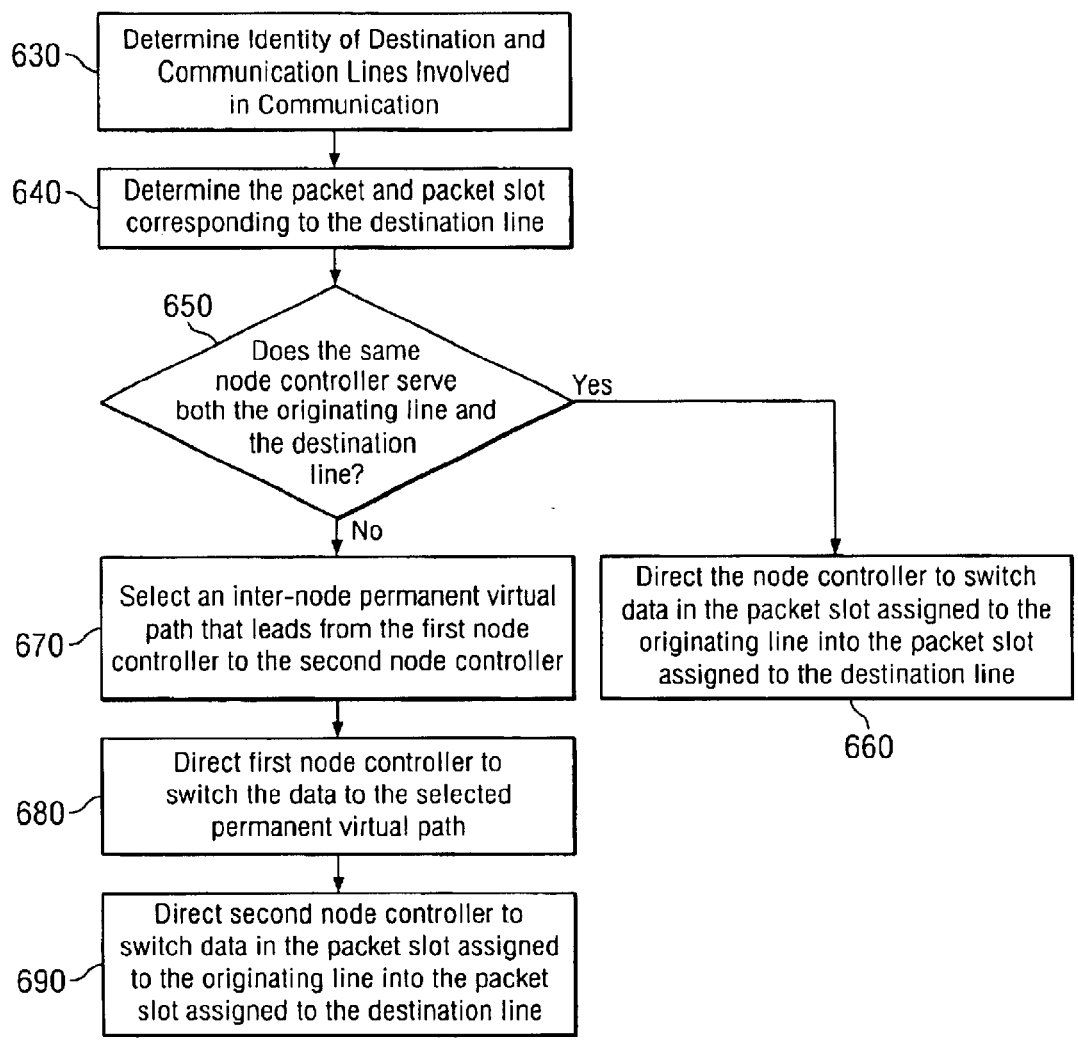
FIG. 6 illustrates an exemplary operation of a multiple node network having permanent virtual circuits in accordance with the invention.

FIG. 6 illustrates an exemplary operation of the multi-node network. First, in step 630, call server 120 determines the originating and destination communication lines involved in the connection. The call server 120 then determines the packet and packet slot corresponding to the destination line (step 640). If the same node controller 140 serves both lines, call server 120 requests the node controller involved to switch the lines using packet slot switching (step 660). Otherwise, if two different node controllers 140 serve the lines, call server 120 selects on each node controller 140 an inter-node permanent virtual path or junctor, that leads to the other node controller via the INS 410 (step 670). Then, call server 120 requests each node controller 140 to switch the packets to the selected inter-node junctor (step 680). Since the INS 410 is pre-configured with permanent virtual paths between node controllers, the call server 120 does not have to send the INS 410 any control commands on a call-by-call basis. When the node controller servicing the destination line receives the packets from INS 410, it then performs packet slot switching. In particular, the node controller 140 switches the data in the packet slot assigned to the originating line into the packet slot assigned to the destination line (step 690).

Access Controller

The access controller 160 receives DS0 format signals from intelligent processing equipment (IPE). In particular, the access controller 160 supports all existing DS0-based peripherals including line cards, trunk cards and service cards. In the preferred embodiment, each access controller receives data from 16 cards, each card having 32 DS0 channels, for a total of 640 DS0 channels.

In order to guarantee minimal delay for constant bit rate traffic, such as voice and video, the access controller feeds pulse-code-modulated samples of data into a designated slot in a designated cell every 125-microsecond period. With STS-3 (or OC-3) framing, 44 cells are transmitted in each 125-microsecond period. One of ordinary skill in the art would appreciate that the number of cells transmitted in each period varies with the framing (transmission speed) selected. Of the 44 available cells, 14 cells are dedicated to convey the DS0 data. The remaining 30 to 32 cells are used to convey regular variable bit rate traffic and messaging. One of ordinary skill would appreciate that the term "slot" may correspond to an octet or any other desired size slot.

Figure 7:
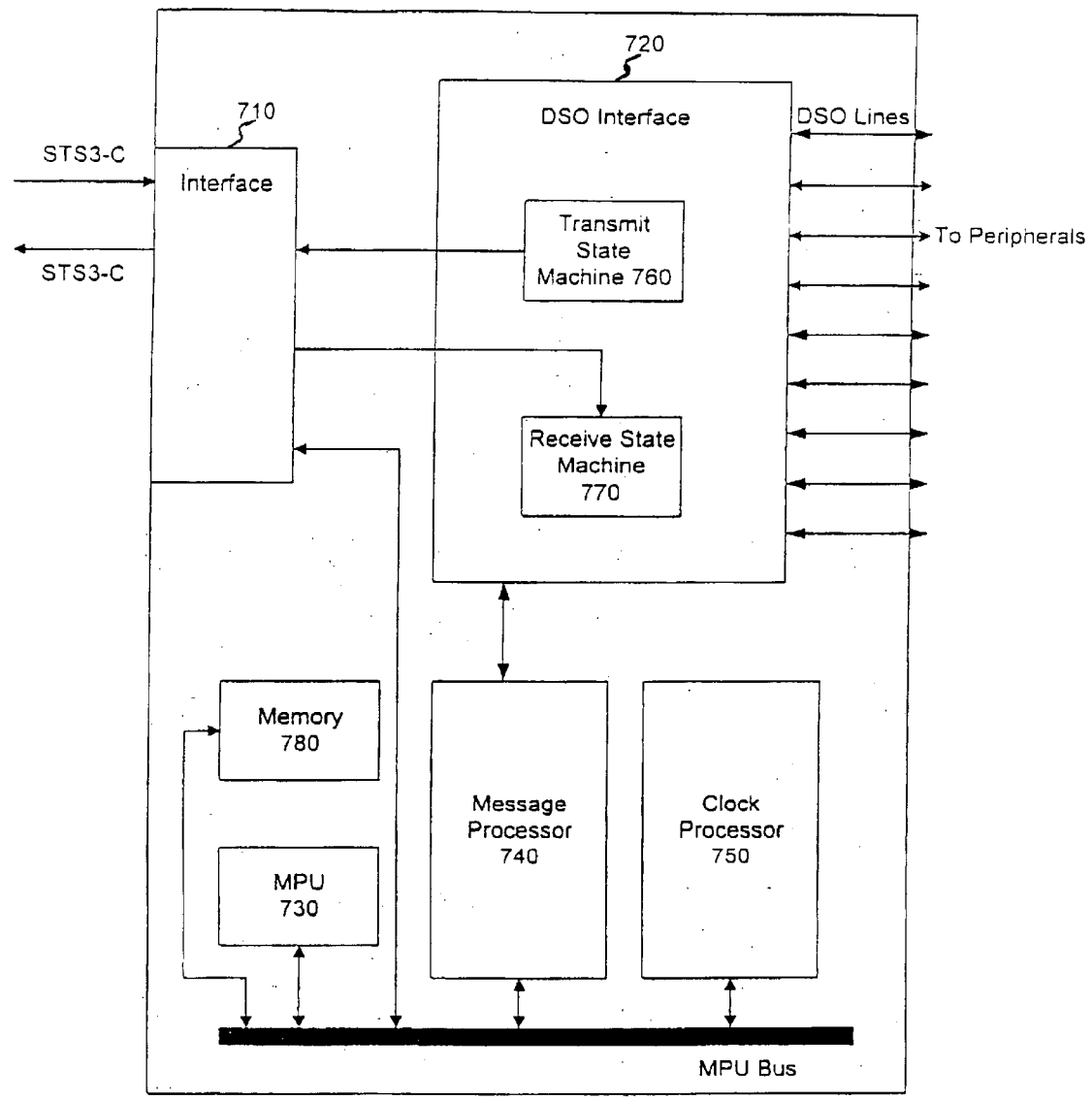
FIG. 7 is a block diagram of an access controller consistent with the present invention.

FIG. 7 is a block diagram of an access controller consistent with the present invention. The access controller 160 includes an interface 710, a DS0 Handler 720, a microprocessor unit (MPU) 730, a message processor 740, and a clock processor 750. Interface 710 generates a header error correction (HEC) code, adds the HEC code to the header, packs the ATM cells into the STS-3c (or OC-3) frame, and sends the data out serially at the 155.52 Mbps data rate. In the receive direction, the interface receives a 155.52 Mbps serial data stream, removes the ATM cells from the STS-3c (or OC-3) framing, and verifies the HEC code. A preferred interface for performing these functions is the SUNI-LITE™ interface from PMC-Sierra as a STS3-C (or OC-3) framer. Each STS3-C link carries 640 DS0 channels per 125 microsecond frame. Optionally, each access controller includes two ATM interfaces 710 to provide network access redundancy.

Message Processor 740 processes messages from the peripherals to the network elements as well as messages from the network elements to the peripherals. Message processor 740 includes an interface for receiving the messaging from the peripherals and a buffer for temporarily storing the messaging. The message processor 740 reads the messages from the buffer and either processes the messages locally or sends the messages to the appropriate network element such as the call server 120. Messages sent to the call server 120 include, for example, a message indicating the identity of the destination party in a call between an originating party and a destination party. The messaging between the call server 120 and the access controller 160 is done by using the ATM Adaption Layer type 5 (AAL5). The ATM adaption layer (AAL) provides services to the higher layers that support classes of service for transported data. Those of ordinary skill would appreciate that a message processor consistent with the invention could use any other ATM adaption layer type.

The DS0 Handler 720 receives integrated voice and data channels from the intelligent peripheral devices. It then maps the data from these channels into ATM cells to be sent to the switching network through interface 710. The DS0 handler also receives ATM cells from the switching network through interface 710. It un-maps the ATM cells back into the integrated voice and data channels in a manner complementary to the mapping function.

Each frame, the access controller 160 sends a total of 14 ATM cells numbered 0 to 13. The DS0s are stored from octet 6 to octet 52 in the 14 cells. Each of the 640 lines received by the DS0 handler is assigned to a specific cell number and a specific octet number in the 14 ATM cells. The DS0 handler simply takes the data on line x, and places it in cell a, slot b according to a translation map. To perform this function, the DS0 handler includes a transmit state machine and a receive state machine. The state machines could be implemented using programmable gate arrays. In accordance with the ATM to DS0 map, the transmit state machine maps DS0 from a particular card number, and line number to a particular cell number and octet number on the 14 ATM cell frame. In a complementary manner, the receive state machine un-maps data from a particular cell number and octet number in a received 14 cell ATM frame into DS0 data associated with a particular card number and line number.

Clock processor 740 provides various clock signals for network operation. For example, the clock processor generates the 8 KHz frame needed to transmit ATM cells every 125 microseconds.

Node Controller

The node controller 140 is preferably capable of providing switching with the granularity of a single octet. In other words, the node controller performs traditional ATM cell switching as well as switching of n octets, where n=1 to 48. In describing the invention, the term octet switching refers to the switching of an individual octet (i.e., a byte) in a cell or packet. The term slot switching (whether in a packet or a cell) encompasses not only octet switching, but also the switching of n octets, where n=1 to 48 in an ATM cell and n=1 to X in a packet having a payload of X octets.

Figure 8:
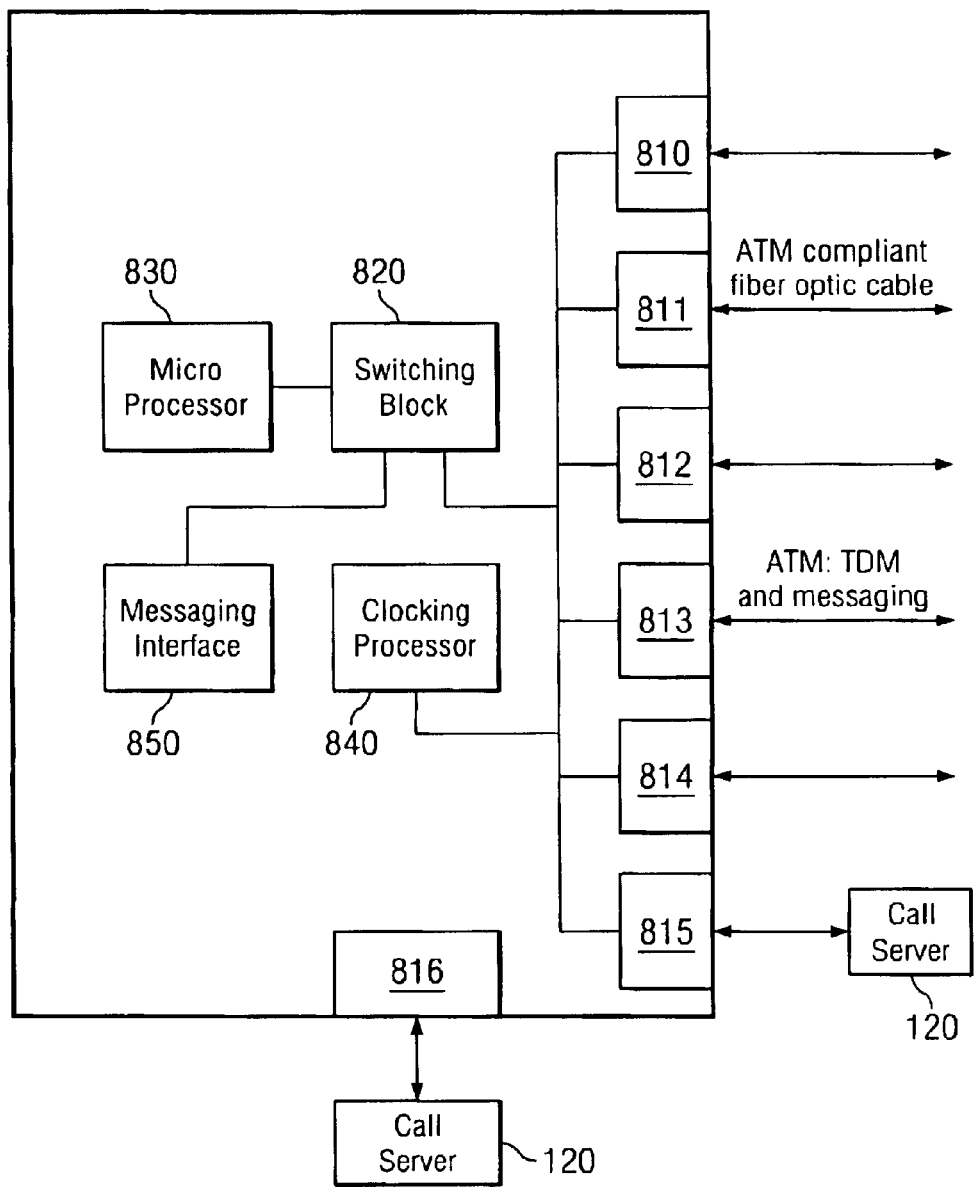
FIG. 8 is a block diagram of a node controller consistent with the present invention.

FIG. 8 is a block diagram of a node controller consistent with the present invention. The node controller 140 includes interfaces 810–816, switching block 820, microprocessor 830, clock processor 840, and messaging interface 850. In the preferred embodiment, seven ATM links connect to interfaces 810–816. Two of the ATM links interface with the call server 120, providing a redundant configuration, and four of the ATM links interface with four access controllers 160. Although the seventh ATM link is not used in the node controller shown in FIG. 8, one of ordinary skill would appreciate that the seventh port interface with a network element, such as an access controller or an application server like Meridian Mail or Interactive Voice Response. Regardless of whether the interface is connected to a call server, an inter-node switch, an access controller, or an applications server, the architecture of each interface 810–816 remains the same.

Interfaces 810–813 receive data packed into ATM cells from the one or more access controllers. The ATM cells that travel between the access controller and the node controller include both DS0 data and messaging data. In the single-node architecture, interface 814 receives only messaging data from the call server 120. In the multi-node architecture, interface 814 receives both DS0 and messaging data from the INS 410.

As shown in FIG. 8, node controller 140 includes messaging interface 850 for termination and generation of AAL5 messaging. Messages received from access controller 160 are terminated locally or routed through to the call server 120. Where appropriate, messaging interface 850 assists in the routing of cells containing messaging from the access controller to the call server. This routing is performed using traditional ATM cell switching instead of octet switching. Messaging interface 850 also terminates the messages that are intended for the node controller and creates messages to be sent from the node controller to other network elements.

Each of the interfaces 810–815 are connected to switching block 820. The node controller 140 includes a switching block 820 to support message routing using standard packet switching and switching of DS0 data using packet slot switching. Examples of switching blocks that switch both cells and octets are disclosed in U.S. patent application, Ser. No. 08/655,402, filed May 30, 1996, entitled TELECOMMUNICATIONS APPARATUS AND METHOD and U.S. Pat. No. 5,841,771, issued Nov. 24, 1998, entitled TELECOMMUNICATIONS SWITCH APPARATUS AND METHOD FOR TIME SWITCHING, both incorporated herein by reference.

Microprocessor 830 oversees the functions performed by the node controller 140. For example, microprocessor 830 oversees the operation of interfaces 810–816, updates and downloads system software, detects errors and provides redundancy switch-overs, and stores the firmware. In addition, microprocessor 830 communicates with the call server 120. In particular, microprocessor receives and processes the messaging between the node controller and the call server 120.

Clock processor 840 receives clock signals from inter-node switch 410 (in the multiple node architecture) or from call server 120 (in the single node architecture) over the ATM links. Software will select the clock from one of the interfaces (call server or INS depending on the system architecture) and use that for its internal clock generation. A receive clock can come from any of the interfaces. From this clock, the node controller will generate the transmit clocks for the ATM interfaces and a 8 KHz frame pulse for use by the switch fabric.

Figure 9:
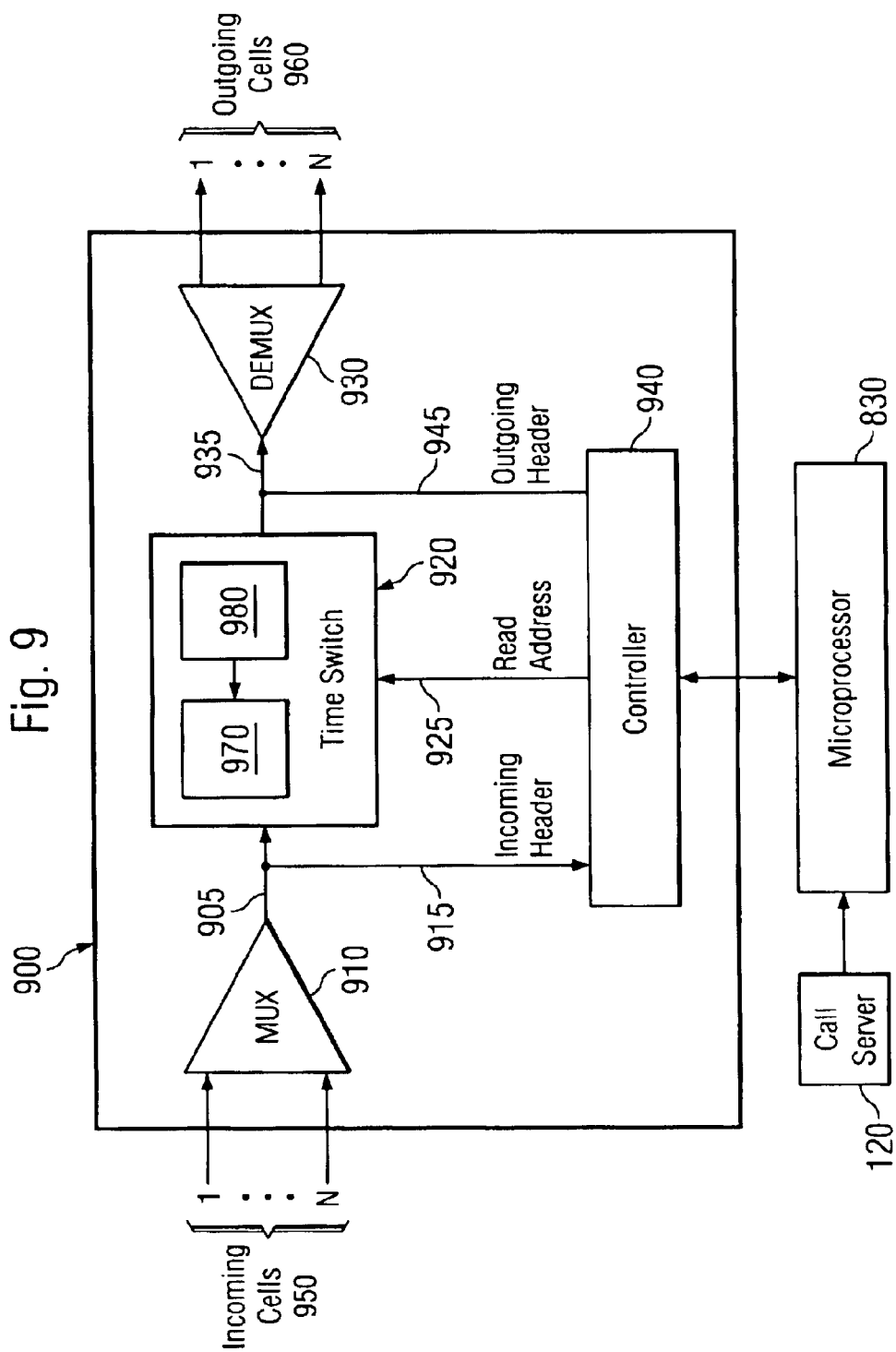
FIG. 9 is a block diagram of a switching block in a node controller consistent with the present invention.

FIG. 9 is a block diagram of a switching block 900 for switching packet slots. An input multiplexer 910 and an output demultiplexer 930 are interconnected with a DS0 time switch integrated circuit 920. Incoming ATM cells are received at regular rates by the input multiplexer 910, via input lines 1-n, labeled 950. The input multiplexer 910 orders the incoming cells into a high speed data stream. At the output of the multiplexer 910, the high speed data stream is divided between two data streams, a payload data stream on a bus 905, and a header data stream, on a bus 915. The payload data stream consists of octets 06–53 and the header data stream consists of octets 01–05.

The DS0 time switch integrated circuit 920 receives the payload data stream. The DS0 time switch integrated circuit 920 exchanges the data in the various payload octet positions of the cells directed to it by the multiplexer 910. To perform this function, the time switch performs two essential steps. First, the time switch sequentially stores each octet in a buffer 970. Second, the time switch controller 980 reads out the octets from the buffer 970 in a random order thus creating a reordered set of payload data. The output of time switch integrated circuit 920 is a cell-structured payload data stream on a bus 935 wherein the octets are switched from a first cell number, slot number to a second cell number, slot number.

Controller 940 directs the octet switching functions of the DS0 time switch IC 920. Specifically, controller 940, in cooperation with time switch controller 980, selects a block of storage locations in the buffer 970 in the time switch integrated circuit 920 into which a cell, having been applied to the bus 905, is synchronously and sequentially stored. Based on input from microprocessor 830, output controller 940 also provides read addresses to time switch controller 980 for specifying an order of reading the octets from buffer 970 onto the bus 935, thus directing the switching of the octets. The octets read from buffer 970 form a newly ordered payload data stream. The read address from the controller 940 is supplied to the time switch IC 720 via a random read address bus 925.

Controller 940 also provides outgoing headers for the cells of payload data via bus 945. The data on buses 935 and 945 are combined as high speed stream of outgoing multiplexed cells at the input of a demultiplexer 930. Demultiplexer 930 operates in a manner more or less complementary to the function of the multiplexer 910. In particular, demultiplexer 930 distributes the outgoing multiplexed cells, as ATM cells across lines 1-n, labeled 960.

In this manner, systems and methods consistent with this invention sequentially store the cell octets and randomly reading the cell octets to effect a desired altered order in the cell slots in each 14-cell frame. It will be recognized by persons of typical skill in the electronic switching and telephony arts that the objective of rearranging the temporal order of the octets can also be effected in the time switch by randomly storing the cell octets and sequentially reading the cell octets.

Call Server

The call server 120 is responsible for all call processing from the time a call is initiated until it is terminated. Call server 120 interfaces with the node controller 140 (in the single node configuration) or the inter-node switch 410 (in the multiple node configuration) via a STS-3c link to pass messaging to the network. As used in this specification, the terms messaging, signalling, and control information are interchangeable. In particular, the call server 120 performs several important functions in connection with the switching of octets and cells. First, call server 120 recognizes the originating party and determines the location of the destination party. Second, call server 120 sets the path for the node controller 140 to switch the DS0 data from the originating line to an ATM cell going to the destination line. Specifically, the call server receives a signalling package from the access controller when a telephone call (or other communication) is originated. The signalling package might include an "off-hook" message. The signalling package is passed from the peripheral (e.g., a line card) to the access controller 160 to the node controller 140 to the call server 120. Call server 120 includes a look-up table that allows it to translate the received message into a destination location and the cell slot assigned to that destination location. Call server 120 then sends a messaging packet to the node controller containing the destination route information. The call server 120 sends the node controller 140 a signalling packet identifying (1) the ATM link, (2) the cell in the 14-cell frame and (3) the cell slot in which the node controller should place the data in the originating cell slot.

In addition to call processing, the call server 120 also operates as a communication interface between the system management platform (SMP) 170, the INS 310, the node controller(s) 140 and the access controllers 160 so the SMP 170 can retrieve information from and send information to these network elements to perform management functions. Finally, the call server 120 supplies a reference clock source to the switching network.

Figure 10:
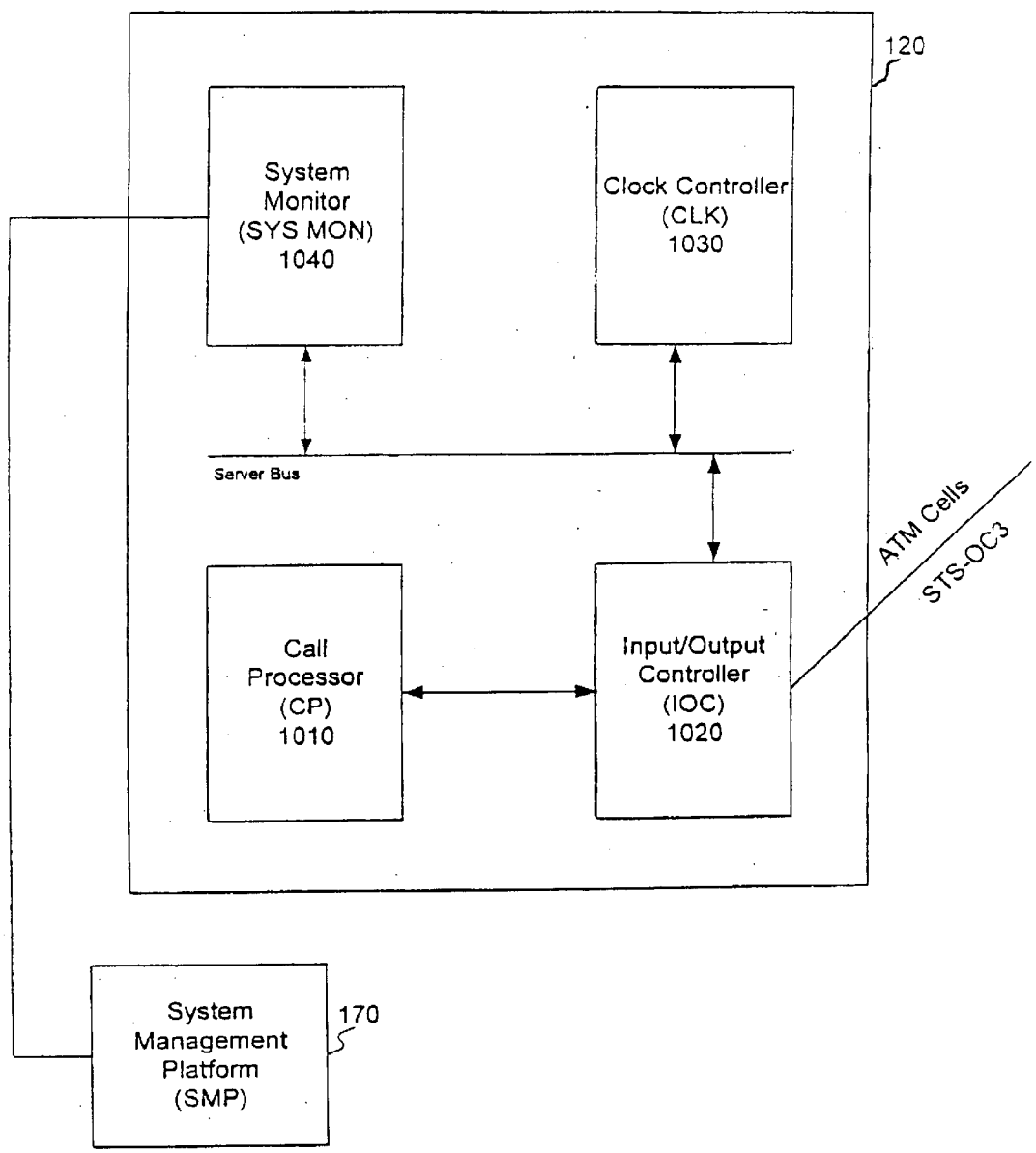
FIG. 10 is a block diagram of a call server consistent with the present invention.

FIG. 10 is a block diagram of a call server consistent with the present invention. The call server consists of a call processor (CP) 1010, an input-output controller (IOC) 1020, a clock controller (CLK) 1030, and a System Monitor (SYSMON) 1040. The call processor 1010 is a software-based processor having dynamic memory banks that support centralized call processing and system resource management. In particular, the call processor 1010 translates the above-described messages from the access controllers 160 into destination information and sends control information to the access stage and the switching stage to assist in the mapping and switching functions.

The input-output controller (IOC) 1020 performs two major functions. First, the input-output processor stores system software for the call processor 1010 and all other network elements, as well as system configuration data, customer data base, and alarm and trace log files. Second, the input-output controller 1020 interconnects the call server 120 with the switching network. Specifically, two ATM ports are provided to connect the input-output controller 1020 to the inter-node switch 310 (in the multiple node configuration) or the node controller 140 (in the single-node configuration).

The system monitor (SYSMON) 1040 oversees the system power and environmental conditions, ensuring that the conditions are adequate to maintain network operation. Upon detection of inadequate conditions, the SYSMON 1040 activates alarms that trigger the call processor (CP) 1010 to initiate corrective actions.

The clock controller 1030 provides the network with an accurate clock signal. The switching stage 130 uses the clock reference for synchronization purposes. The clock controller 1030 serves as a master clock and can either generate a clock signal, or more preferably, it can derive the clock signal from the public switched network via a digital interface such as a T1/E1 digital interface.

Network Synchronization

Figure 11:
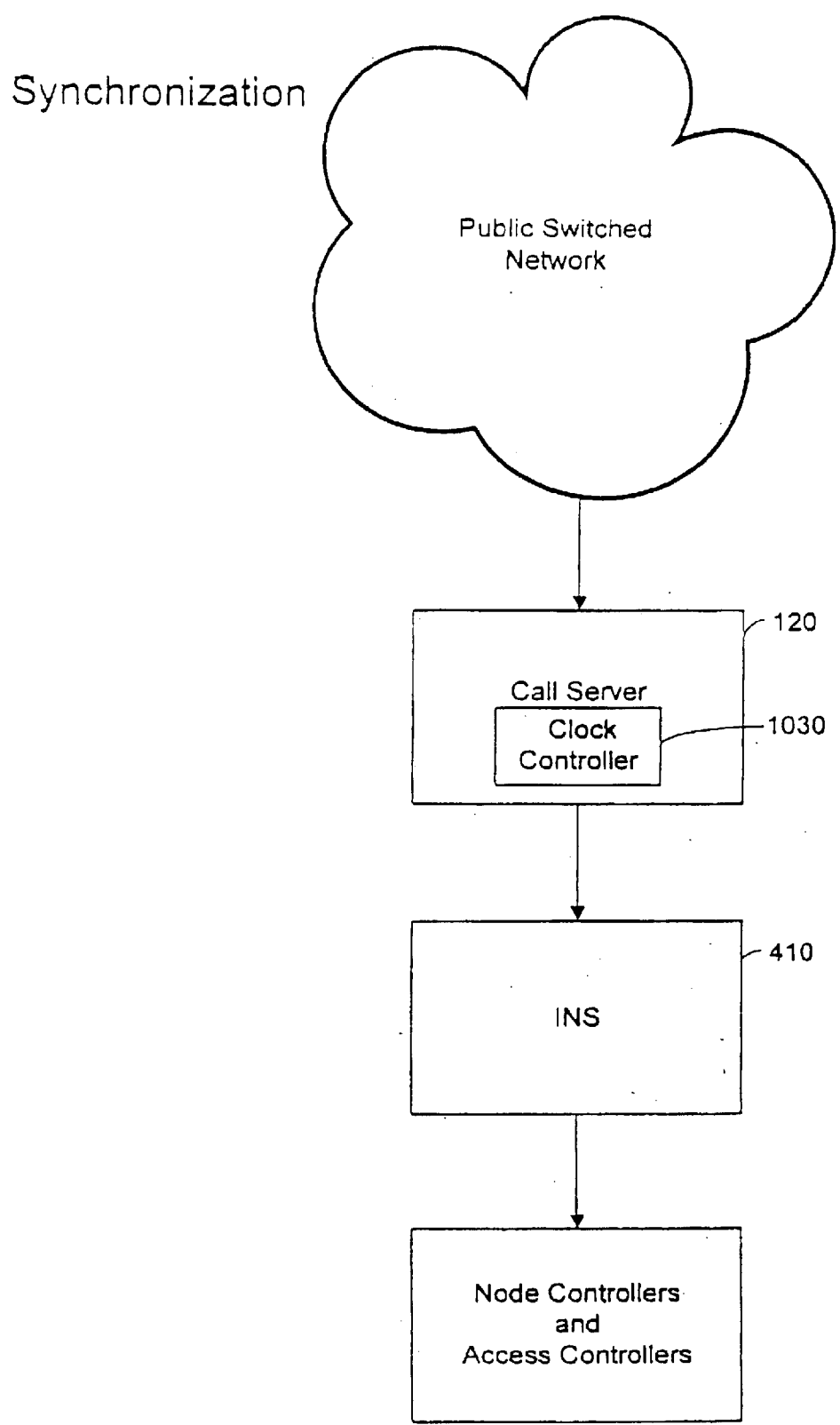
FIG. 11 is a block diagram of a network including clock synchronization in accordance with the present invention.

Because the network is based on a synchronous architecture, a common system clock must be used to coordinate the rate of internal mapping and switching operation as well as internal traffic flow. FIG. 11 is a block diagram of a synchronization mechanism employed in the present invention. The clock controller 1030 is placed in the call server 120 and is synchronized to a network supplied timing source such as the master clock in the public switched network. In particular, the clock controller 1030 derives a system clock from a T1/E1 link connected to the public switching network. The INS is used as a slave clock to pass on the system clock from the upstream call server to the downstream node controllers and access controllers. The inter-node switch 410 derives a slave clock from an ATM link between the inter-node switch and the call server. The inter-node switch then provides a slave clock at each of the ATM ports connected to the node controllers 140. The node controllers 140 in turn provide the clock signals to the access controllers 160. In this manner, the elements of the network are synchronized to the same clock source.

Figure 12:
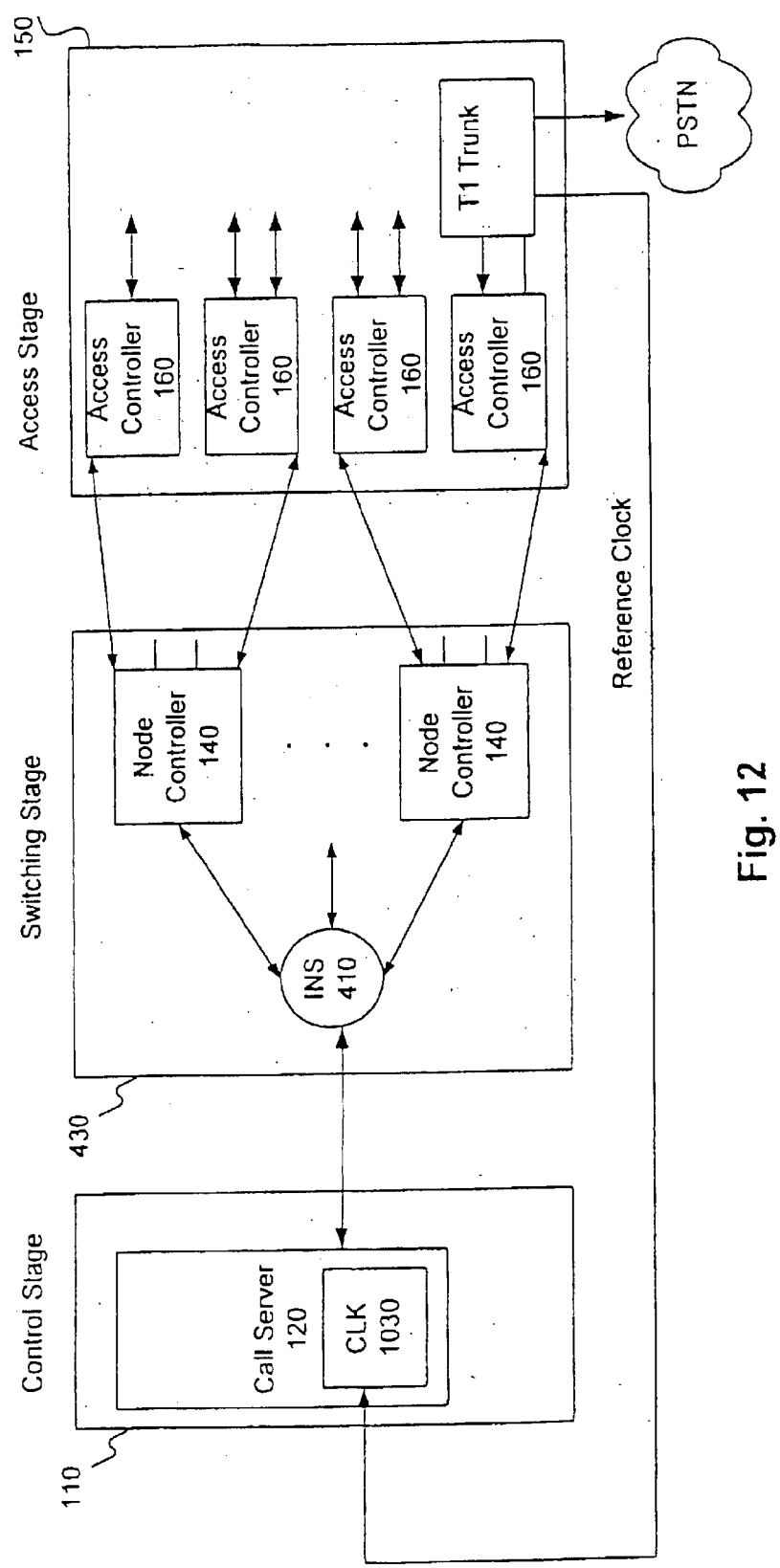
FIG. 12 is a more detailed block diagram of a network including clock synchronization in accordance with the present invention.

FIG. 12 is a more detailed block diagram of the synchronization mechanism shown in FIG. 11. The master clock, clock controller 1030, is synchronized to a network supplied timing source such as the clock in the public switched network. In particular, the clock controller 1030 in call server 120 derives a clock from a T1/E1 link connected to the T1 trunk connected to the public switching network. As discussed in connection with FIG. 11, the master clock 1030 in the call server 120 is used to coordinate the rate of internal mapping and switching operation as well as internal traffic flow. The INS 410 is redundantly connected to the call server 120 via to ATM links. The INS 410 can derive the clock signal from either of the two input links. If connection to one of two ATM links is lost, the clock controller 1030 will switch-over to synchronize the INS clock on the other line.

One of ordinary skill in the art would appreciate that the clock controller 1030 could be located in a different network element. For example, instead of being located in call server 120, the clock controller could be located in INS 410. In a manner similar to clock controller 1030, an INS clock controller derives the system clock from a SONET link to the public switching network.

Redundancy

In order to obtain a higher level of reliability, systems and methods consistent with the present invention offer different levels of redundancy.

Figure 13:
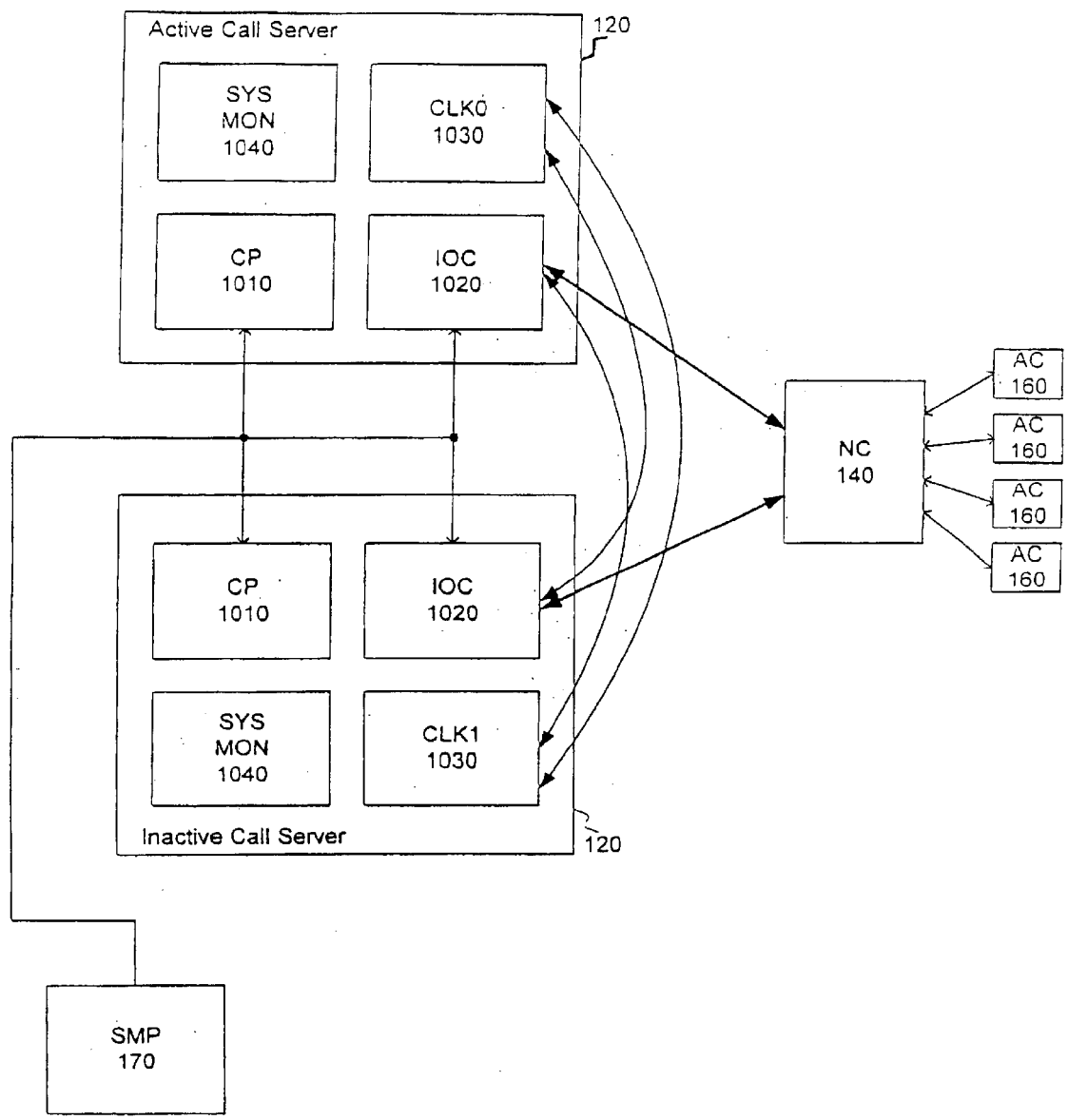
FIG. 13 is a block diagram of the single-node architecture in FIG. 1 with a redundant call server.
Figure 14:
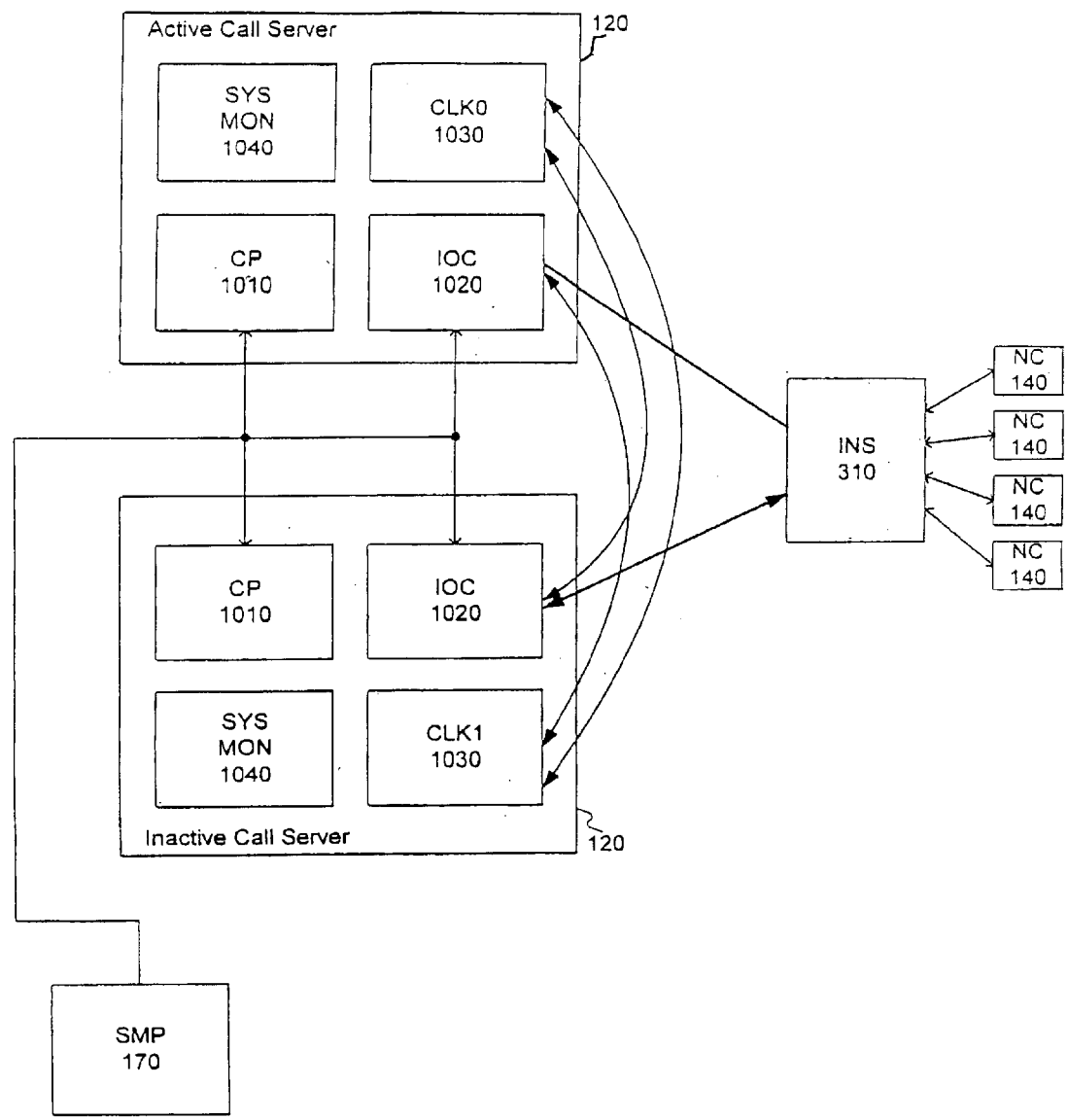
FIG. 14 is a block diagram of the multiple node architecture in FIG. 2 with a redundant call server.
Figure 15:
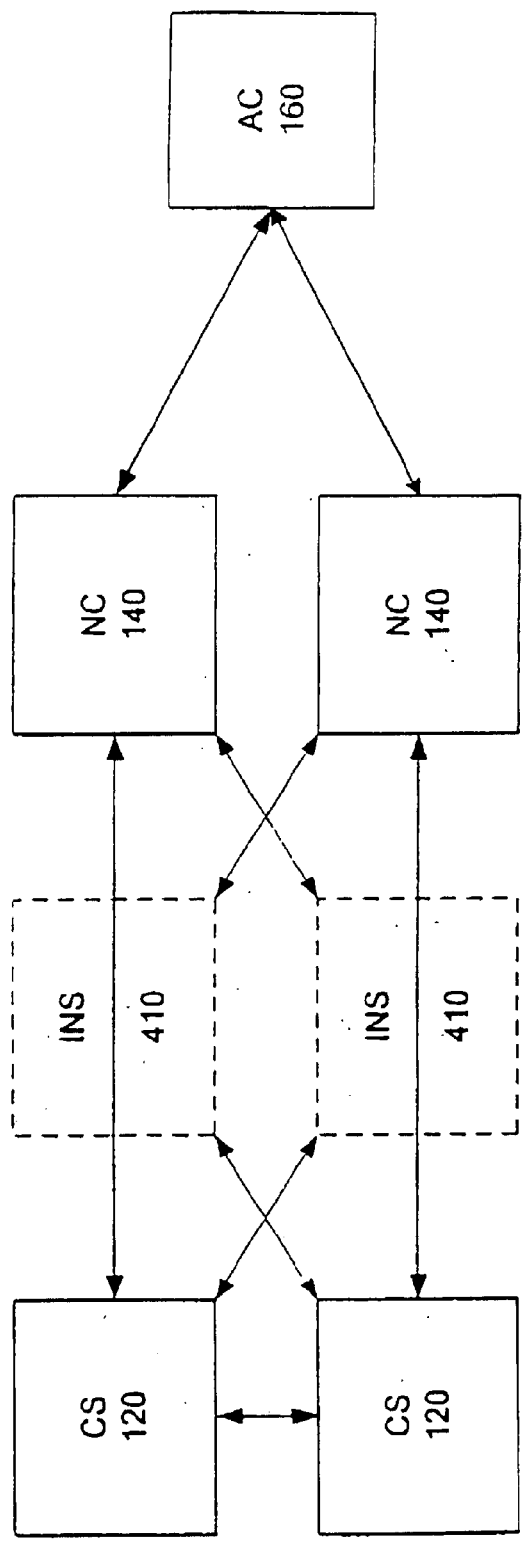
FIG. 15 is a block diagram of an architecture consistent with the present invention having a redundant node controller, a redundant inter-node switch, and a redundant call server.

A second call server can be optionally added to the system configuration. FIG. 13 shows a block diagram of a single-node network consistent with the present invention having a redundant call server. FIG. 14 shows a block diagram of a multiple-node network consistent with the invention having a redundant call server. As shown in both FIGS. 13 and 14, the two call servers 120 are interconnected with each other so that they can operate in a redundant mode. The call server redundancy uses a stand-by scheme whereby one call server is active while the second one is held inactive but ready to run. A switch-over allows the active call server to relinquish control and let the other call server become active. While the active call server 120 usually controls the switch-over, the switch-over is automatically triggered when the active call server is deemed faulty. In FIG. 13, node controller 140 connects to both call servers and can receive and transmit messaging from either call server link at anytime. Similarly, in FIG. 14, INS 410 connects to both call servers and can receive and transmit messaging from either call server link at any time.

The two call processors 1010 are interconnected via an inter-CP cable and the two input-output controllers 1020 are interconnected via an inter-IOC cable. Both of the input-output controllers 820 are permanently active. The call processors 1010 are programmed to operate in a redundant mode; that is, one call processor is selected to be active while the other is inactive. The dynamic memory banks in the two call processors 1010 are updated via the inter-CP cable. When the active call processor reads from the dynamic memory, only the primary memory on the active call processor is read, but when the active processor writes to the active memory, the secondary memory on the inactive call processor is automatically updated. The content of the mass storage, hard disk, is similarly synchronized in real-time via the inter-IOC cable.

Both clock controllers, CLK0 and CLK1, are permanently active. Under normal operation, the active clock controller selects which CLK 1030 is providing the more accurate clock signal. A CLK switch-over occurs when the CLK pair notifies the input/output processor that the secondary clock is generating a better clock signal. The active CP-IOC then picks up the clock signal from the second clock therefore switching the primary and secondary clocks. The inter-node switch 410 (or the node controller 140 in the single node architecture) is connected to the call servers via two ATM links and can derive the slave clock signals from either of these two links.

FIG. 14 illustrates additional levels of redundancy consistent with the present invention. First, systems and methods consistent with the invention offer peripheral access redundancy. In particular, the access controller 160 provides an optional redundant link, so one access controller can connect to two redundant node controllers 140. The access controller optionally includes two interfaces 710 for separate interaction with the primary and secondary node controllers. The access controller transmits DS0 cells on both the active link and the standby link, transmits messaging cells only on the active link, and listens only to the active link with respect to receiving DS0 and messaging cells. Peripheral access redundancy is centrally coordinated by call server 120 which tells access controller 160 which link is the primary ATM link. When one of the interfaces 710 detects a fault with the primary link, node controller 160 automatically switches to receive on the other link and notifies the call server of the switch.

Similarly, each node controller 140 provides an optional redundant link, so one node controller can connect to two redundant inter-node switches 410. Finally, each inter-node switch 410 provides an optional redundant link, so an inter-node switch 410 can connect to two redundant call servers 120.

Figure 16:
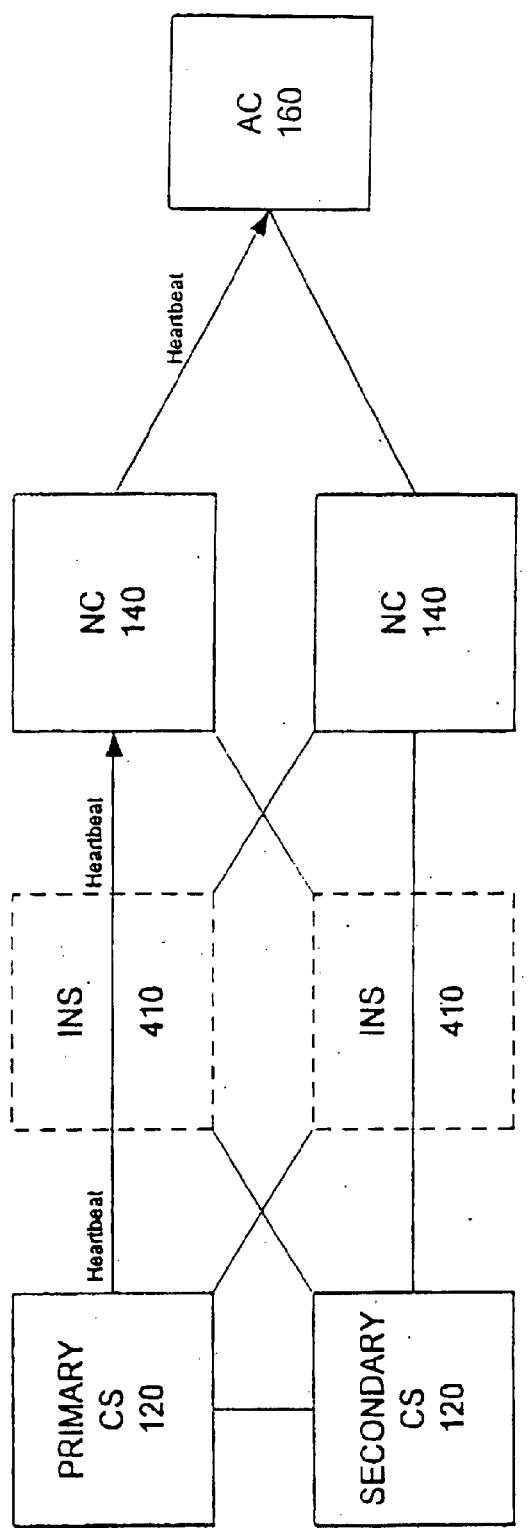
FIG. 16 illustrates a heartbeat mechanism in a network in accordance with the present invention.

Redundancy is centrally coordinated by call server 120. In performing this function, call server 120 implements a heartbeat mechanism. FIG. 16 illustrates the use of a heartbeat mechanism in a network consistent with the present invention having redundant network elements and/or links. The call server 120 generates a heartbeat signal (e.g., a periodic message). The call server 120 periodically transmits the signal in an ATM cell to the inter-node switch 410 (or the node controller 140 in the single node structure) which in turn passes the signal on to the node controller 140 (or the access controller 120 in the single node structure) which in turn passes the signal to the access controller 120.

Upon receipt of the heartbeat signal, each network element sends a response back to the call server. If the call server 120 does not receive a response from a particular network element or elements, the call server informs SMP 170, detects which element is faulty, and directs the appropriate switch-over to a redundant network element.

While there has been illustrated and described to be preferred embodiments and methods of the present invention, those skilled in the art will understand that various changes and modifications may be made, and equivalents may be substituted for elements thereof, without departing from the true scope of the invention.

For example, although the preferred embodiment has been described as providing pulse-code modulated (PCM) data over ATM, one of ordinary skill would appreciate that the invention is not limited to ATM cells. Rather, methods and systems consistent with the invention could use any type of packet data. For example, systems and methods consistent with the invention include an access stage for converting PCM into internet protocal (IP) packets for transfer over an Ethernet or standard LAN, a switching stage for providing packet and packet slot switching of the IP packets, and a control stage.

In addition, many modifications may be made to adapt a particular element, technique or implementation to the teachings of the present invention without departing from the central scope of the invention. Therefore, this invention should not be limited to the particular embodiments and methods disclosed herein, but should include all embodiments falling within the scope of the appended claims.

What is claimed is:

1. A method for mapping time division multiplex (TDM) data from a plurality of ports into packets, comprising:
   receiving TDM data from at least some, but not all, of a plurality of devices each uniquely coupled to one of the plurality of ports;
   writing received TDM data from each port into a packet slot preassigned to the corresponding port; and
   maintaining the availability of each preassigned slot for TDM data from the corresponding port regardless of the presence of TDM data on the port.

2. The method of claim 1, further comprising the step of transmitting the packet data at a constant rate.

3. The method according to claim 1, wherein the step of writing the TDM data into a preassigned packet slot includes the step of writing the data into a preassigned packet in a frame containing multiple packets.

4. The method of claim 1, wherein the step of writing TDM data from each port into a packet slot preassigned to the corresponding port further comprises:
   writing TDM data from each port, if any, to the preassigned packet slot within an asynchronous transfer mode (ATM) cell frame.

5. The method of claim 1, further comprising:
   switching TDM data into asynchronous transfer mode (ATM) cell frames using packet slot switching and switching messages into ATM cell frames utilizing standard ATM packet switching.

6. A method for mapping time division multiplex (TDM) data into packets, comprising:
   receiving TDM data from at least some, but not all, of a plurality of devices each uniquely coupled to one of a plurality of ports; and
   writing the TDM data from each port into a packet and a packet slot permanently assigned to the port.

7. The method of claim 6, further comprising the step of transmitting the packets at a constant rate.

8. A system for mapping time division multiplex (TDM) data from a plurality of ports into packets, comprising:
   means for receiving TDM data from at least some, but not all, of a plurality of devices each uniquely coupled to one of the plurality of ports;
   means for writing TDM data from a first port into a first packet slot assigned to the first port; and
   means for maintaining the availability of the first slot for TDM data received from the first port regardless of the presence of TDM data on the first port.

9. The system of claim 8, further comprising means for transmitting the packets at a constant rate.

10. A method for mapping time division multiplex (TDM) data from a plurality of ports into packets, comprising:
    receiving TDM data from the plurality of ports;
    writing TDM data from each port into a packet slot preassigned to the corresponding port;
    maintaining the availability of each preassigned slot for TDM data from the corresponding port regardless of the presence of TDM data on the port;
    if necessary, moving TDM data from a packet slot preassigned to a corresponding source port to a packet slot preassigned to a corresponding destination port; and
    writing TDM data from each preassigned packet slot to a corresponding destination port.

11. A system for mapping time division multiplex (TDM) data from a plurality of ports into packets, comprising:
    a first interface to receive TDM data from the plurality of ports, the first interface including a state machine to write the TDM data from each port into a packet slot preassigned to the port,
    wherein the preassigned slots are maintained available for TDM data received from the corresponding port regardless of the presence of TDM data on the corresponding port,
    wherein the first interface receives TDM data from at least some, but not all, of a plurality of devices each uniquely coupled to one of the plurality of ports.

12. The system according to claim 11, wherein the first interface further comprises:
    a second state machine to receive packet data from a network and translate the data in each preassigned packet slot into TDM data to be sent to the port corresponding to the packet slot.

13. The system according to claim 11, further comprising:
    a second interface to receive packet data from the first interface and transmit the packet data at a constant rate to a network.

14. The system according to claim 13, further comprising a clock processor to generate a transmit clock for use by the second interface in transmitting the packet data at the constant rate.

15. The system according to claim 14, wherein the clock processor generates the transmit clock based on reference clock signals received from the network.

16. The system according to claim 12, wherein the second interface writes TDM data from each port, if any, to the preassigned packet slot within an asynchronous transfer mode (ATM) cell frame.

17. The system according to claim 11, wherein TDM data is switched into asynchronous transfer mode (ATM) cell frames using packet slot switching and messages are switched into ATM cell frames utilizing standard ATM packet switching.

18. A system for mapping time division multiplex (TDM) data from a plurality of ports into packets, comprising:

a first interface to receive TDM data from the plurality of ports, the first interface including a state machine to write the TDM data from each port into a packet slot preassigned to the port, wherein the preassigned slots are maintained available for TDM data received from the corresponding port regardless of the presence of TDM data on the corresponding port; and a node controller moving TDM data, if necessary, from a packet slot preassigned to a source port to a packet slot preassigned to a destination port, wherein the node controller writes TDM data from each preassigned packet slot to a corresponding destination port.

19. A method for mapping time division multiplex (TDM) data from a plurality of ports into packets, comprising:

receiving TDM data from the plurality of ports;

writing TDM data received from each port into a packet slot preassigned to the corresponding port for receipt of TDM data; and reading TDM data from each of the packet slots, wherein each packet slot is preassigned to a corresponding port for transmission of TDM data, and wherein at least one packet slot is preassigned to a different port for receipt of TDM data than for transmission of TDM data.

20. The method according to claim 19, further comprising:

transmitting TDM data read from each packet slot on the corresponding port.

* * * * *